(12) United States Patent
Chen

(10) Patent No.: US 11,079,210 B2
(45) Date of Patent: Aug. 3, 2021

(54) SENSING DISTANCE TO TERMINAL

(71) Applicant: Beijing Xiaomi Mobile Software Co., Ltd., Beijing (CN)

(72) Inventor: Chaoxi Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 83 days.

(21) Appl. No.: 16/445,902

(22) Filed: Jun. 19, 2019

(65) Prior Publication Data

US 2019/0390948 A1   Dec. 26, 2019

(30) Foreign Application Priority Data

Jun. 20, 2018  (CN) .......................... 201810639046.6

(51) Int. Cl.
*G01B 7/02* (2006.01)
*G06F 3/044* (2006.01)
*H04M 1/60* (2006.01)

(52) U.S. Cl.
CPC .............. *G01B 7/023* (2013.01); *G06F 3/044* (2013.01); *H04M 1/6041* (2013.01)

(58) Field of Classification Search
CPC ..................... G01B 7/023; G06F 3/044; G06F 2203/04101; H04M 1/6041; H04M 1/026; H04M 1/72563; H04M 1/72569; H04M 2250/22; H04M 2250/12
See application file for complete search history.

(56) References Cited

U.S. PATENT DOCUMENTS

| | | | |
|---|---|---|---|
| 2011/0003614 A1* | 1/2011 | Langereis | G01S 15/06 455/550.1 |
| 2012/0258772 A1* | 10/2012 | Brogle | G01D 5/2405 455/556.1 |
| 2013/0005413 A1 | 1/2013 | Brogle et al. | |
| 2013/0157726 A1* | 6/2013 | Miyazaki | G06F 3/0443 455/566 |
| 2015/0077140 A1 | 3/2015 | Chu et al. | |
| 2016/0150399 A1 | 5/2016 | Zhang et al. | |

(Continued)

FOREIGN PATENT DOCUMENTS

| | | | |
|---|---|---|---|
| CN | 102387252 A | 3/2012 | |
| EP | 3 021 561 A1 | 5/2016 | |
| EP | 3021561 A1 * | 5/2016 | ........ H04M 1/72569 |

OTHER PUBLICATIONS

Extended European Search Report dated Oct. 10, 2019 in European Patent Application No. 19181233.8, 8 pages.

(Continued)

*Primary Examiner* — Akm Zakaria
(74) *Attorney, Agent, or Firm* — Oblon, McClelland, Maier & Neustadt, L.L.P.

(57) ABSTRACT

The disclosure relates to a method of sensing a distance applicable to a terminal including capacitive touch sensors. The method includes, when the terminal enters a non-hands-free call state, increasing an electric field strength of the touch sensors and/or decreasing a preset threshold, wherein the touch sensors generate raw data based on sensed signals when the sensed signals are greater than the preset threshold; and determining a distance between an object and the terminal based on the raw data generated by the touch sensors.

9 Claims, 5 Drawing Sheets

Electric field strength of the touch sensors is increased and/or a preset threshold is decreased when the terminal enters a non-hands-free call state. When signals sensed by the touch sensors are greater than the preset threshold, raw data is generated according to the sensed signals. — S1

A distance between an object and the terminal is determined according to the raw data generated by the touch sensors. — S2

(56) References Cited

U.S. PATENT DOCUMENTS

2018/0124233 A1* 5/2018 Abramson .............. G06F 3/017

OTHER PUBLICATIONS

Combined Chinese Office Action and Search Report dated Mar. 25, 2020 in Chinese Patent Application No. 201810639046.6 (with unedited computer generated English translation and English translation of Category of Cited Documents), 18 pages.

Office Action dated Aug. 21, 2020 in corresponding Chinese Patent Application No. 201810639046.6 (with English Translation), 17 pages.

* cited by examiner

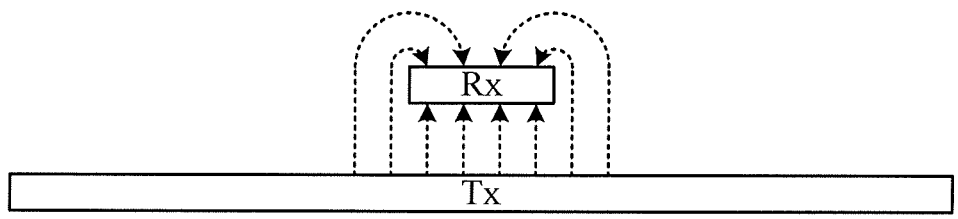

Electric field strength of the touch sensors is increased and/or a preset threshold is decreased when the terminal enters a non-hands-free call state. When signals sensed by the touch sensors are greater than the preset threshold, raw data is generated according to the sensed signals. ~ S1

A distance between an object and the terminal is determined according to the raw data generated by the touch sensors. ~ S2

FIG. 1

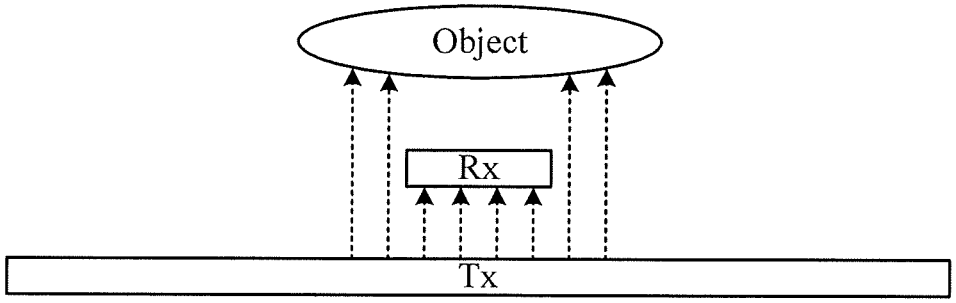

FIG. 2A

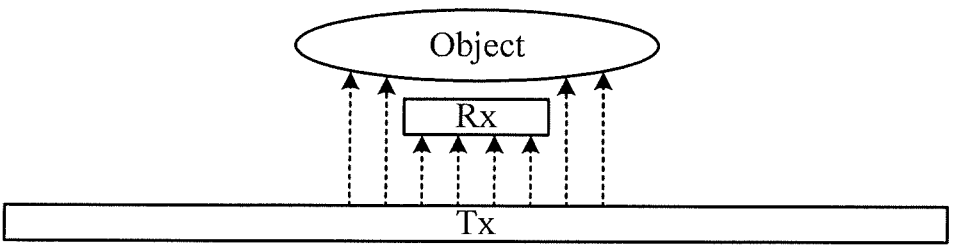

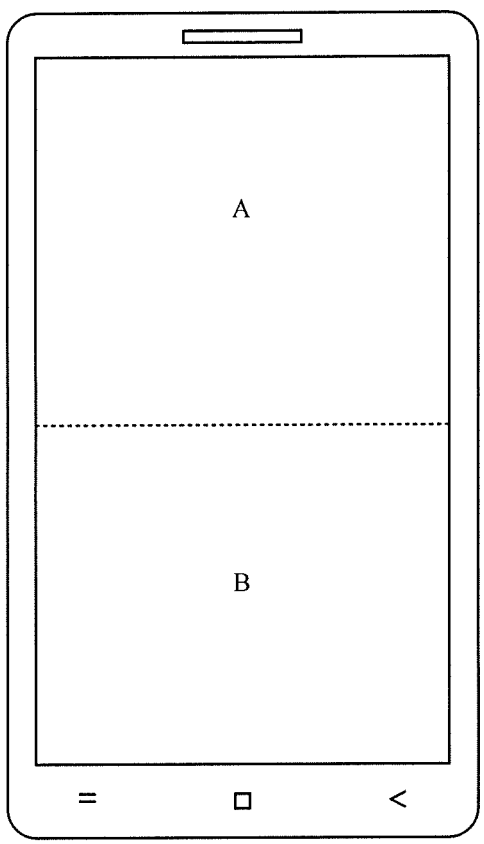

FIG. 3

| Electric field strength of the touch sensors is increased and/or a preset threshold is decreased when the terminal enters a non-hands-free call state. When signals sensed by the touch sensors are greater than the preset threshold, raw data is generated according to the sensed signals. | S1 |

↓

| A number of the touch sensors from each of which a sensed signal is greater than the preset threshold and/or an area corresponding to the touch sensors from each of which a sensed signal is greater than the preset threshold are determined. | S3 |

↓

| If the number is greater than a preset number, and/or the area is greater than a preset area, a distance between an object and the terminal is determined according to the raw data generated by the touch sensors. | S21 |

FIG. 4

SENSING DISTANCE TO TERMINAL

CROSS-REFERENCE TO RELATED APPLICATIONS

This application is based on and claims priority to Chinese Patent Application No. 201810639046.6, filed on Jun. 20, 2018, the entire contents of which are incorporated herein by reference.

TECHNICAL FIELD

The present disclosure relates to the field of sensor technology, and in particular, to sensing a distance to a terminal.

BACKGROUND

A full screen has become a trend of terminals, such as mobile phones. Generally, however, a hole is to be opened on one side of a mobile phone on which a screen is provided for a distance sensor to transmit and receive signals, thereby reducing a proportion of an area of a front screen of the mobile phone.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of sensing a distance, applicable to a terminal including capacitive touch sensors. The method includes, when the terminal enters a non-hands-free call state, increasing an electric field strength of the touch sensors and/or decreasing a preset threshold, wherein the touch sensors generate raw data based on sensed signals when the sensed signals are greater than the preset threshold; and determining a distance between an object and the terminal based on the raw data generated by the touch sensors.

According to an aspect, the terminal further includes a receiver, and distances between the touch sensors and the receiver are less than a preset distance.

In one example, the touch sensors are located in a preset region of the terminal.

According to an aspect, when determining the distance between the object and the terminal based on the raw data generated by the touch sensors, the method further includes determining a number and/or an area of the touch sensors from each of which a sensed signal is greater than the preset threshold; and when the number is greater than a preset number and/or the area is greater than a preset area, determining the distance between the object and the terminal based on the raw data generated by the touch sensors.

According to another aspect, the method further includes, when, during a preset time period, the number is not greater than the preset number and/or the area is not greater than the preset area, decreasing the electric field strength of the touch sensors and/or increasing the preset threshold.

According to yet another aspect, the method further includes, when the terminal enters a hands-free call state from the non-hands-free call state, decreasing the electric field strength of the touch sensors and/or increasing the preset threshold.

Aspects of the disclosure also provide an apparatus for sensing a distance. The apparatus is applicable to a terminal including capacitive touch sensors. The apparatus includes a processor, and a memory for storing instructions executable by the processor. The processor is configured to, when the terminal enters a non-hands-free call state, increase an electric field strength of the touch sensors and/or decrease a preset threshold, wherein the touch sensors generate raw data based on sensed signals when the sensed signals are greater than the preset threshold; and determine a distance between an object and the terminal based on the raw data generated by the touch sensors.

Aspects of the disclosure also provide a non-transitory computer-readable storage medium storing instructions that, when executed by one or more processors of a terminal comprising capacitive touch sensors, cause the terminal to, when the terminal enters a non-hands-free call state, increase an electric field strength of the touch sensors and/or decrease a preset threshold, wherein the touch sensors generate raw data based on sensed signals when the sensed signals are greater than the preset threshold; and determine a distance between an object and the terminal based on the raw data generated by the touch sensors.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of the specification, illustrate aspects consistent with the present disclosure and, together with the description, serve to explain the principles of the disclosure.

FIG. 1 is a flowchart illustrating a method of sensing a distance according to an exemplary aspect of the present disclosure.

FIGS. 2A to 2C are schematic diagrams illustrating generating raw data according to an exemplary aspect of the present disclosure.

FIG. 3 is a schematic diagram illustrating a preset region according to an exemplary aspect of the present disclosure.

FIG. 4 is a flowchart illustrating a method of sensing a distance according to another exemplary aspect of the present disclosure.

Figure 5:
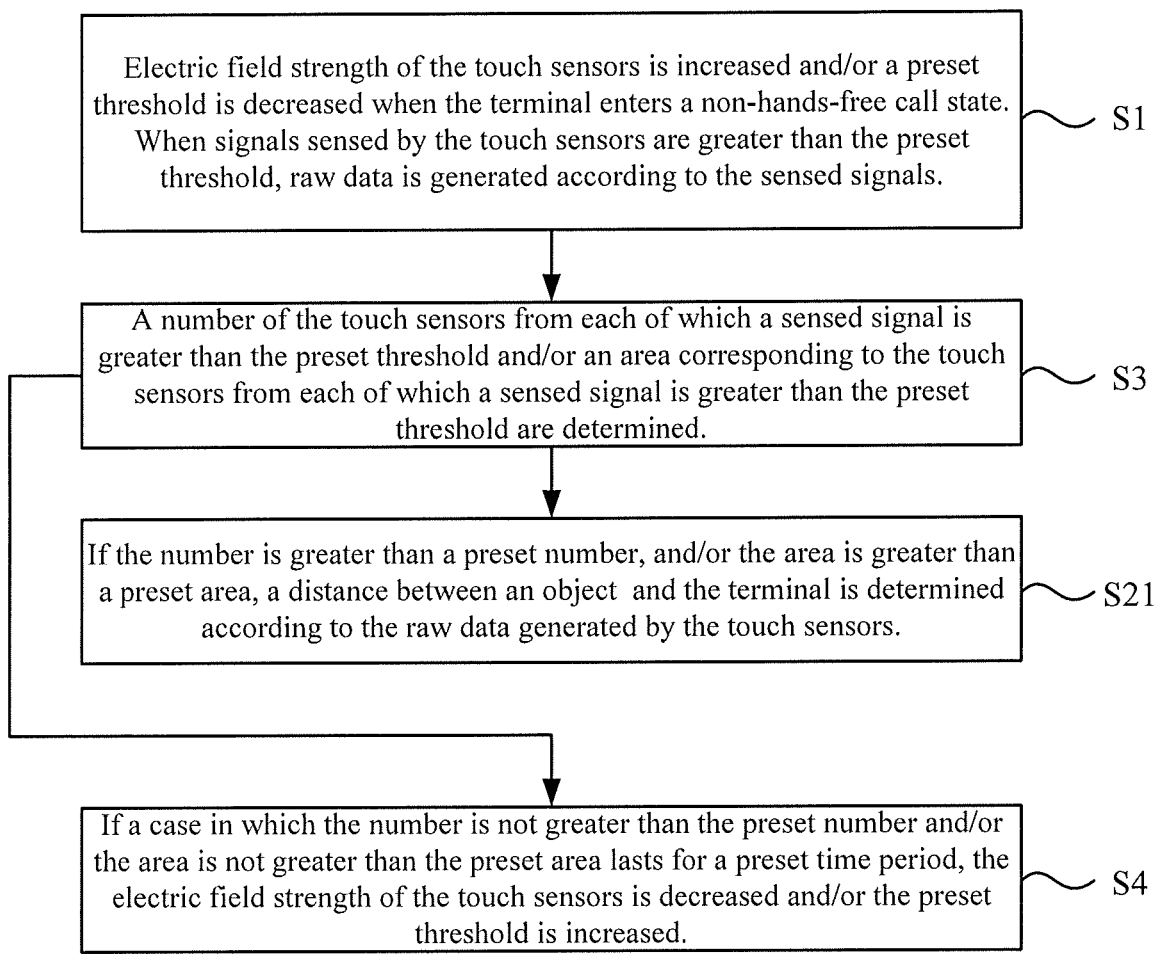
FIG. 5 is a flowchart illustrating a method of sensing a distance according to still another exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

FIG. 1 is a flowchart illustrating a method of sensing a distance according to an exemplary aspect of the present disclosure. The method of sensing a distance may be applied to a terminal, such as a mobile phone and a tablet computer, and the terminal may include capacitive touch sensors, such as self-capacitive touch sensors or mutual-capacitive touch sensors.

As shown in FIG. 1, the method of sensing a distance may include the following blocks.

At block S1, electric field strength of the touch sensors is increased and/or a preset threshold is decreased when the terminal enters a non-hands-free call state. When signals (such as capacitance signals, or voltage signals obtained by capacitance conversion) sensed by the touch sensors are greater than the preset threshold, raw data is generated according to the sensed signals.

In an example, whether the terminal enters a call state may be monitored. The call state may include a state in which a call is made by dialling or a state in which a call is made through a communication application such as QQ, Wechat, skype or the like. When it is determined that the terminal enters the call state, whether a hands-free mode is on may be further determined. If the hands-free mode is off, it may be determined that the terminal enters a non-hands-free call state.

At block S2, a distance between an object and the terminal is determined according to the raw data generated by the touch sensors.

FIGS. 2A to 2C are schematic diagrams illustrating generating raw data according to an exemplary aspect of the present disclosure.

A mutual capacitive touch sensor may include a plurality of transmission lines Tx and receiving lines Rx that intersect with each other, and a capacitor formed at intersections of transmission lines Tx and receiving lines Rx may function as a touch sensor. When no object is close to the capacitor (for example, as shown in FIG. 2A), a capacitance value of the capacitor does not change. When an object (e.g. a user) is close to the capacitor, the object may act as one pole of the capacitor. Since the capacitance value of the capacitor is inversely proportional to a distance between two poles of the capacitor, the capacitance value increases as the distance between two poles of the capacitor decreases when the object approaches the capacitor (for example, as shown in FIG. 2B and FIG. 2C). The touch sensor may convert the changed capacitance value into a voltage value and generate raw data based on the voltage value.

When a touch sensor senses a touch signal, a user's finger generally touches the touch sensor or a structure above the touch sensor. Therefore, in this case, the touch sensor is only desired to radiate an electric field to a small range around the touch sensor without a need to set the electric field strength of the touch sensor too high. Further, since the finger is relatively close to the touch sensor, a signal sensed by the touch sensor is relatively large. Therefore, a preset threshold may be set to be relatively large, so that the touch sensor may generate raw data only when the sensed signal is large.

When the terminal enters a non-hands-free call state, it may be determined that a user is going to approach or has been close to the terminal for call. Thus, it is desired to sense a distance between the user and the terminal. When the user approaches the terminal for making a call, since the head of the user generally does not touch the touch sensors or the structure above the touch sensors, changes in the capacitance values of the touch sensors caused by an electric field action between the head and the touch sensors are very small, and sensed signals generated by the touch sensors based on the changes in the capacitance value may be far less than the preset threshold. In this case, raw data will not be generated according to the sensed signals.

It can be seen that the sensitivity of generating the raw data by the touch sensors according to the sensed signals may be increased by increasing the electric field strength of the touch sensors and/or decreasing the preset threshold.

It is to be noted that only the electric field strength of the touch sensors may be increased, or only the preset threshold may be decreased, or the preset threshold may be decreased while the electric field strength of the touch sensors is increased.

The head of the user may be caused to act with a stronger electric field by increasing the electric field strength of the touch sensors, so that the capacitance values of the touch sensors may generate a large change, that is, the signals sensed by the touch sensors are enhanced, and thus raw data may be more easily generated based on the sensed signals; by decreasing the preset threshold, the raw data may still be generated based on the sensed signals in a case that the signals sensed by the touch sensors are small, thereby determining the distance between the object and the terminal according to the raw data. Operations of turning off backlight of a screen and so on may be performed when the distance is less than a preset distance.

Thus, a distance between an object and a terminal may be determined by touch sensors rather than a distance sensor. The touch sensors are arranged in the terminal without a need to open a hole on one side of the terminal on which a screen is provided, which facilitates increasing an area proportion of the screen.

Optionally, the terminal may also include a receiver, where distances between the touch sensors and the receiver are less than a preset distance.

In an example, a user may usually have his ear close to the receiver of the terminal during a call, and therefore larger sensed signals may be generated easily between the user and the touch sensors on one end of the terminal where the receiver is provided.

In this case, the respective electric field strength may be increased and/or the preset threshold may be decreased for the touch sensors with distances to the receiver less than the preset distance in the terminal without adjusting the respective electric field strength and the preset threshold of the touch sensors with distances to the receiver greater than or equal to the preset distance. Therefore, not all touch sensors on the terminal are to be adjusted on the basis of ensuring that the touch sensors are capable of determining the distance between the object and the terminal, thereby reducing resources and power consumed by the adjusting operation.

Optionally, the touch sensors are located in a preset region of the terminal.

In an example, the preset region may be arranged according to actual needs, and then the electric field strength may be increased and/or the preset threshold may be decreased only for the touch sensors in the preset region. For example, the preset region may be a region that a user is habituated to approaching on the terminal during a call.

FIG. 3 is a schematic diagram illustrating a preset region according to an exemplary aspect of the present disclosure. For example, as shown in FIG. 3, a screen (the touch sensors may be arranged between the screen and protection glass) of the terminal may be divided into two regions A and B, and any one of the two regions may be taken as the preset region according to actual needs. For example, if the user is habituated to approaching the region A during a call, the region A may be taken as the preset region.

Thus, not all touch sensors on the terminal are to be adjusted on the basis of ensuring that the touch sensors are capable of determining the distance between the object and the terminal, thereby reducing resources and power consumed by the adjusting operation.

FIG. 4 is a flowchart illustrating a method of sensing a distance according to another exemplary aspect of the present disclosure. As shown in FIG. 4, based on the example shown in FIG. 1, the method of sensing a distance includes the following blocks.

At block S1, the electric field strength of the touch sensors is increased and/or the preset threshold is decreased when the terminal enters a non-hands-free call state. The touch sensors generate raw data according to sensed signals when the sensed signals (such as capacitance signals, or voltage signals obtained by capacitance conversion) are greater than the preset threshold.

At block S3, a number and/or an area of the touch sensors from each of which a sensed signal is greater than the preset threshold is determined.

At block S21, if the number is greater than a preset number, and/or the area is greater than a preset area, a distance between an object and the terminal is determined according to the raw data generated by the touch sensors.

In an example, since a user may not approach a particular sensor but a plurality of sensors during a call, the touch sensors approached by the user may correspond to a large area rather than a point.

Therefore, the number of the touch sensors with the sensed signals greater than the preset threshold may be determined. If the number is greater than the preset number, it is determined that an object approaches the terminal indeed and raw data is generated; otherwise, it is determined that the touch sensors make wrong determination and the raw data is not generated.

The area corresponding to the touch sensors with the sensed signals greater than the preset threshold may also be determined. If the area is greater than the preset area, it is determined that an object approaches the terminal indeed and raw data is generated; otherwise, it is determined that the touch sensors make wrong determination and the raw data is not generated.

Only the number of the touch sensors with the sensed signals greater than the preset threshold may be determined or only the area corresponding to the touch sensors with the sensed signals greater than the preset threshold may be determined or both the number of the touch sensors with the sensed signals greater than the preset threshold and the area corresponding to the touch sensors with the sensed signals greater than the preset threshold may be determined. A determination condition may be specifically selected as required.

FIG. 5 is a flowchart illustrating a method of sensing a distance according to still another exemplary aspect of the present disclosure. As shown in FIG. 5, based on the example shown in FIG. 4, the method of sensing a distance further includes the following blocks.

At block S4, if a case, in which the number is not greater than the preset number and/or the area is not greater than the preset area, lasts for a preset time period, the electric field strength of the touch sensors is decreased and/or the preset threshold is increased.

In an example, since the user may not approach the terminal for long in the non-hands-free call state, it may be determined whether a case, in which the number is not greater than the preset number and/or the area is not greater than the preset area, lasts for a preset time period (which may correspond to the determination condition selected in the example shown in FIG. 4, for example, if only the number of the touch sensors with the sensed signals greater than the preset threshold is determined in the example shown in FIG. 4, only whether a case, in which the number is not greater than the preset number, lasts for the preset time period may be determined in this example).

If a case, in which the number is not greater than the preset number and/or the area is not greater than the preset area, lasts for the preset time period, it may be determined that the user does not approach the terminal for a long time, so that the touch sensors may restore a function of sensing a touch operation and the electric field strength of the touch sensors is decreased and/or the preset threshold is increased (which may correspond to the manner of increasing the sensitivity selected at block S1, for example, if only the electric field strength of the touch sensors is increased at block S1, only the electric field strength of the touch sensors may be decreased in this example), thereby avoiding wasting electric energy of the terminal.

Figure 6:
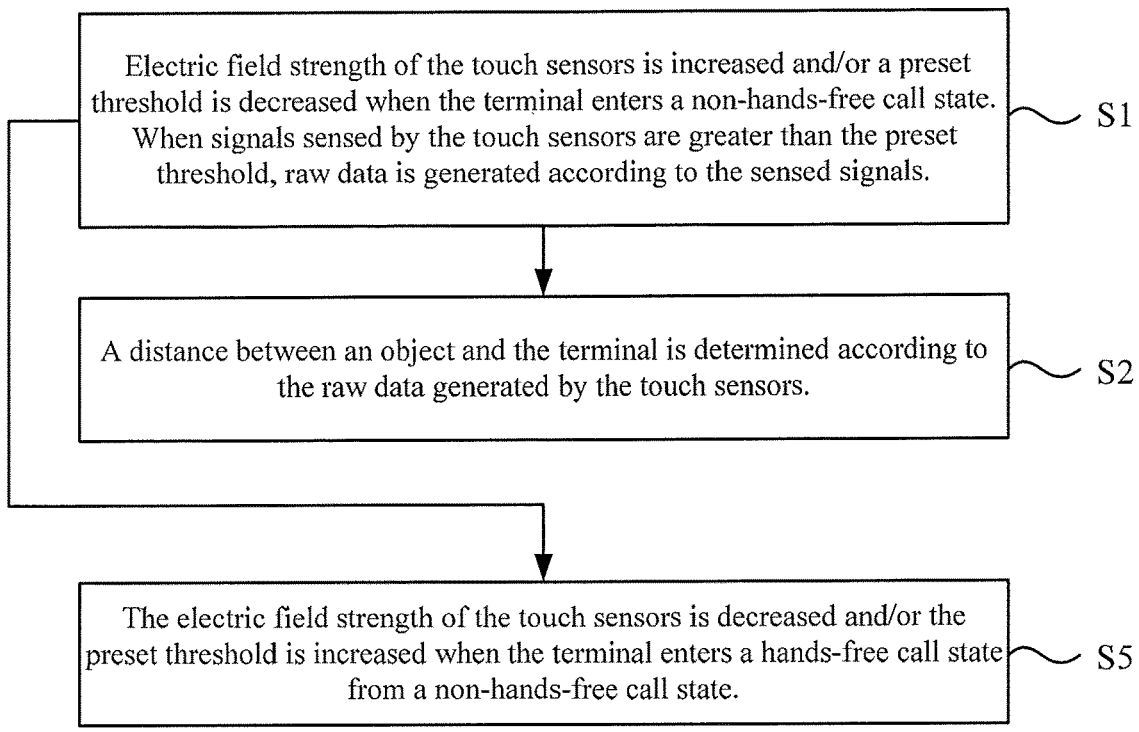
FIG. 6 is a flowchart illustrating a method of sensing a distance according to yet another exemplary aspect of the present disclosure.

FIG. 6 is a flowchart illustrating a method of sensing a distance according to yet another exemplary aspect of the present disclosure. As shown in FIG. 6, based on the example shown in FIG. 1, the method of sensing a distance further includes the following blocks.

At block S5, the electric field strength of the touch sensors is decreased and/or the preset threshold is increased when the terminal enters a hands-free call state from a non-hands-free call state.

In an example, when the terminal enters the hands-free call state from the non-hands-free call state, since the user may hear a voice without a need to approach the terminal, it may be determined that the user is away from the terminal. Thus, it is not desired to sense the distance between the user and the terminal by the touch sensors so that the touch sensors may restore the function of sensing a touch operation, and the electric field strength of the touch sensors may be decreased and/or the preset threshold may be increased (which may correspond to the manner of increasing the sensitivity selected in the example shown in FIG. 1, for example, if only the electric field strength of the touch sensors is increased in the example shown in FIG. 1, only the electric field strength of the touch sensors may be decreased in this example), thereby avoiding wasting the electric energy of the terminal.

Corresponding to the above examples of the method of sensing a distance, the present disclosure also provides an example of an apparatus for sensing a distance.

Figure 7:
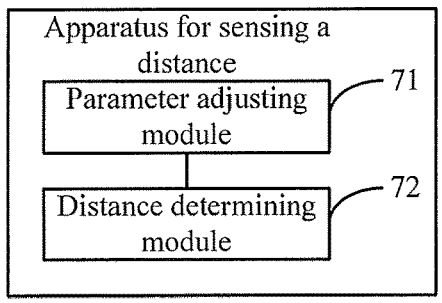
FIG. 7 is a block diagram illustrating an apparatus for sensing a distance according to an exemplary aspect of the present disclosure.

FIG. 7 is a block diagram illustrating an apparatus for sensing a distance according to an exemplary aspect of the present disclosure. The apparatus for sensing a distance may be applied to a terminal, such as a mobile phone and a tablet computer, and the terminal may include capacitive touch sensors, such as self-capacitive touch sensors or mutual-capacitive touch sensors.

As shown in FIG. 7, the apparatus for sensing a distance may include:

a parameter adjusting module 1, configured to increase electric field strength of touch sensors and/or decrease a preset threshold when the terminal enters a non-hands-free call state, where the touch sensors generate raw data according to sensed signals when the signals sensed by the touch sensors are greater than the preset threshold; and a distance determining module 2, configured to determine a distance between an object and the terminal according to the raw data generated by the touch sensors.

Optionally, the terminal may also include a receiver, where distances between the touch sensors and the receiver are less than a preset distance.

Optionally, the touch sensors are located in a preset region of the terminal.

Figure 8:
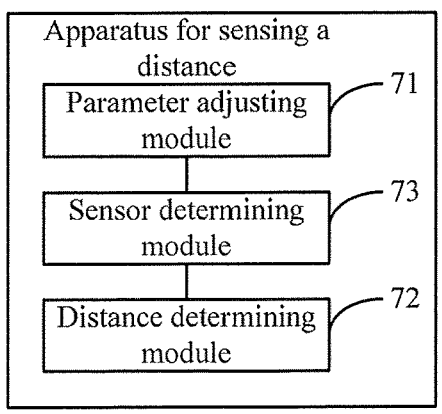
FIG. 8 is a block diagram illustrating an apparatus for sensing a distance according to another exemplary aspect of the present disclosure.

FIG. 8 is a block diagram illustrating an apparatus for sensing a distance according to another exemplary aspect of the present disclosure. As shown in FIG. 8, the apparatus for sensing a distance also includes:

a sensor determining module 3, configured to determine a number of the touch sensors from each of which a sensed signal is greater than the preset threshold and/or an area corresponding to the touch sensors from each of which a sensed signal is greater than the preset threshold.

The distance determining module 2 is configured to determine a distance between an object and the terminal according to the raw data generated by the touch sensors when the number is greater than a preset number and/or the area is greater than a preset area.

Optionally, the parameter adjusting module 1 is also configured to decrease the electric field strength of the touch sensors and/or increase the preset threshold if a case, in which the number is not greater than the preset number and/or the area is not greater than the preset area, lasts for a preset time period.

Optionally, the parameter adjusting module 1 is also configured to decrease the electric field strength of the touch sensors and/or increase the preset threshold when the terminal enters a hands-free call state from a non-hands-free call state.

A specific manner of performing an operation by each module of the apparatus in the above example is described in detail in the relevant method examples, which will not be described in detail herein.

Since the apparatus examples substantially correspond to the method examples, a reference may be made to part of the descriptions of the method examples for the related part. The apparatus examples described above are merely illustrative, where the modules described as separate members may be or not be physically separated, and the members displayed as modules may be or not be physical units, i.e., may be located in one place, or may be distributed in a plurality of network modules. Part or all of the modules may be selected according to actual requirements to implement the objectives of the solutions in the examples. Those of ordinary skill in the art may understand and carry out them without creative work.

An example of the present disclosure also provides an electronic device which may include capacitive touch sensors, and may also include:

a processor; and a memory for storing instructions executable by the processor.

The processor is configured to: increase electric field strength of the touch sensors and/or decrease a preset threshold when the terminal enters a non-hands-free call state, where the touch sensors generate raw data according to sensed signals when the sensed signals are greater than the preset threshold; and determine a distance between an object and the terminal according to the raw data generated by the touch sensors.

An example of the present disclosure also provides a computer readable storage medium storing a computer program. The computer readable storage medium may be applied to a terminal including capacitive touch sensors. When being executed by the processor, the program is caused to implement the following blocks: increasing electric field strength of the touch sensors and/or decreasing a preset threshold when the terminal enters a non-hands-free call state, where the touch sensors generate raw data according to sensed signals when the sensed signals are greater than the preset threshold; and determining a distance between an object and the terminal according to the raw data generated by the touch sensors.

Figure 9:
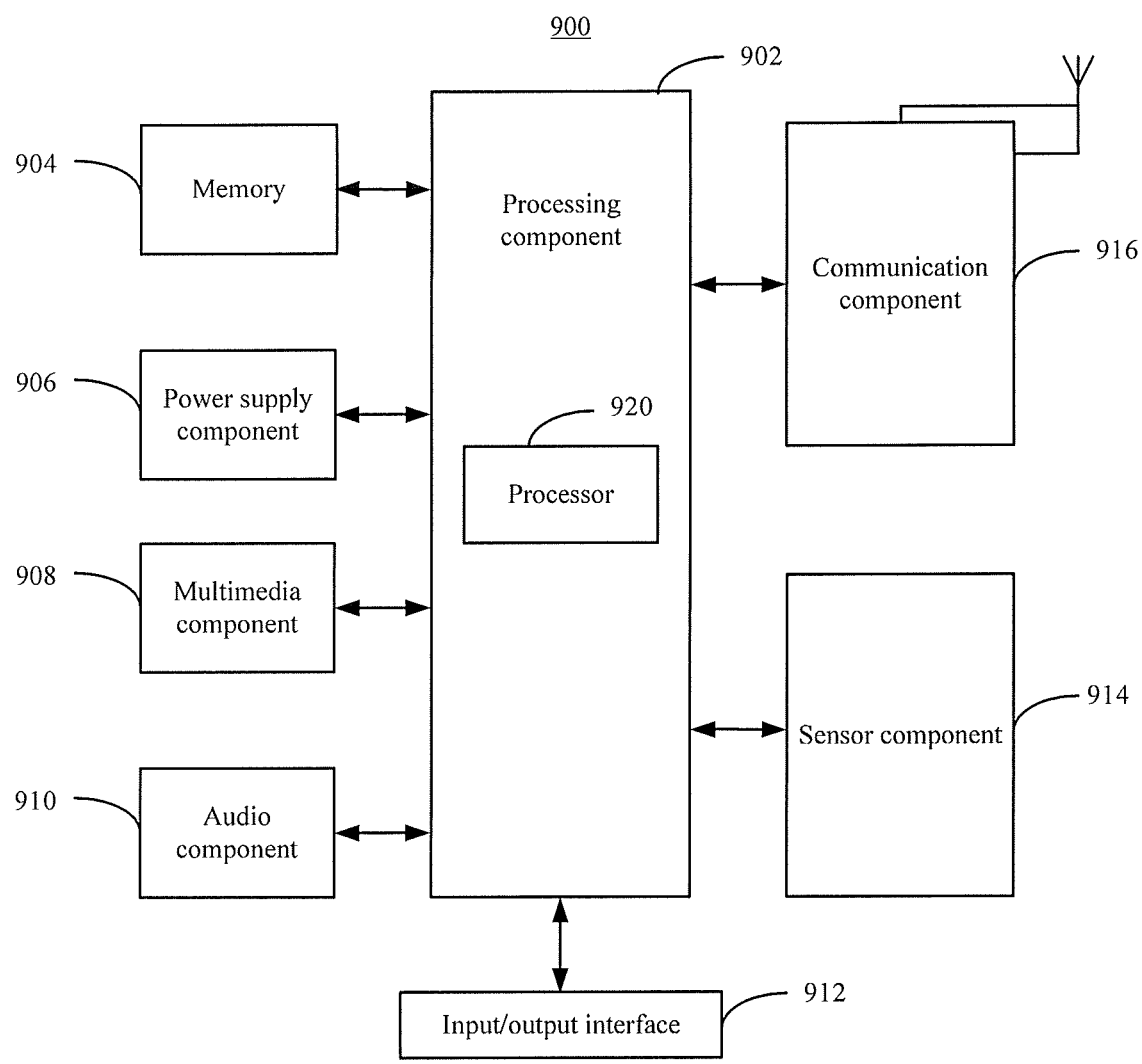
FIG. 9 is a block diagram illustrating an apparatus for sensing a distance according to an exemplary aspect of the present disclosure.

FIG. 9 is a block diagram illustrating an apparatus 900 for sensing a distance according to an exemplary aspect of the present disclosure. For example, the apparatus 900 may be a mobile phone, a computer, a digital broadcast terminal, a message transceiving device, a game console, a tablet device, a medical device, a fitness device, a personal digital assistant and the like.

As shown in FIG. 9, the apparatus 900 may include one or more of the following components: a processing component 902, a memory 904, a power supply component 906, a multimedia component 908, an audio component 910, an input/output (I/O) interface 912, a sensor component 914, a communication component 916, and a capacitive touch sensor (not shown).

The processing component 902 usually controls overall operations of the apparatus 900, such as operations related to display, a telephone call, and data communication, a camera operation and a record operation. The processing component 902 may include one or more processors 920 for executing instructions to complete all or a part of blocks of the above method. Further, the processing component 902 may include one or more modules to facilitate interaction between the processing component 902 and another component. For example, the processing component 902 may include a multimedia module to facilitate the interaction between the multimedia component 908 and the processing component 902.

The memory 904 is configured to store different types of data to support operations at the apparatus 900. Examples of such data include instructions, contact data, phonebook data, messages, pictures, videos, and so on for any application or method that operates on the apparatus 900. The memory 904 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 906 supplies power for different components of the apparatus 900. The power supply component 906 may include a power supply management system, one or more power supplies, and other components associated with generating, managing and distributing power for the apparatus 900.

The multimedia component 908 includes a screen for providing an output interface between the apparatus 900 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding movement, but also detect duration and pressure related to the touching or sliding operation. In some examples, the multimedia component 908 may include a front camera and/or a rear camera. When the apparatus 900 is in an operation mode, such as a shooting mode or a video mode, the front camera and/or the rear camera may receive external multimedia data. Each of the front camera and the rear camera may be a fixed optical lens system or be capable of a focal length and an optical zoom capability.

The audio component 910 is configured to output and/or input an audio signal. For example, the audio component 910 includes a microphone (MIC). When the apparatus 900 is in an operation mode, such as a call mode, a record mode and a voice recognition mode, the microphone is configured to receive an external audio signal. The received audio signal may be further stored in the memory 904 or sent via the communication component 916. In some examples, the audio component 910 also includes a speaker for outputting an audio signal.

The I/O interface 912 provides an interface between the processing component 902 and a peripheral interface module. The above peripheral interface module may be a keyboard, a click wheel, a button, or the like. These buttons may include, but not limited to, a home button, a volume button, a start button and a lock button.

The sensor component 914 includes one or more sensors for providing a state assessment in different aspects for the apparatus 900. For example, the sensor component 914 may detect an on/off state of the apparatus 900 and a relative location of components. For example, the components are a display and a keypad of the apparatus 900. The sensor component 914 may also detect a position change of the apparatus 900 or a component of the apparatus 900, presence or absence of a touch of a user on the apparatus 900, an orientation or acceleration/deceleration of the apparatus 900, and a temperature change of apparatus 900. The sensor component 914 may include a proximity sensor for detecting the existence of a nearby object without any physical touch. The sensor component 914 may also include an optical sensor, such as a CMOS or CCD image sensor used in an imaging application. In some examples, the sensor component 914 may also include an acceleration sensor, a gyro sensor, a magnetic sensor, a pressure sensor, or a temperature sensor.

The communication component 916 is configured to facilitate wired or wireless communication between the apparatus 900 and other devices. The apparatus 900 may access a wireless network based on a communication standard, such as WiFi, 2G or 3G, or a combination thereof. In an example, the communication component 916 receives a broadcast signal or broadcast related information from an external broadcast management system via a broadcast channel. In an example, the communication component 916 may also include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technology.

In an example, the apparatus 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the above examples.

In an example, there is also provided a non-transitory computer readable storage medium including instructions such as the memory 904 including instructions. The above instructions may be executed by the processor 920 of the apparatus 900 to complete the above method. For example, the non-transitory computer readable storage medium may be a Read-Only Memory (ROM), a Random Access Memory (RAM), a CD-ROM, a magnetic tape, a floppy disk and an optical data storage device, etc.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of sensing a distance, applicable to a touch screen terminal comprising capacitive touch sensors provided on the touch screen, the method comprising:
   when the terminal enters a non-hands-free call state,
      increasing an electric field strength of the touch sensors, or
      decreasing a preset threshold, or
      increasing an electric field strength of the touch sensors and decreasing a preset threshold;
      wherein the touch sensors generate raw data based on sensed signals when the sensed signals are greater than the preset threshold; and
   determining a distance between an object and the terminal based on the raw data generated by the touch sensors;
   wherein determining the distance between the object and the terminal based on the raw data generated by the touch sensors comprises:
      determining a number of the touch sensors from each of which a sensed signal is greater than the preset threshold; and when the number is greater than a preset number, determining the distance between the object and the terminal based on the raw data generated by the touch sensors; and the method further comprises:
when, during a preset time period, the number is not greater than the preset number,
decreasing the electric field strength of the touch sensors in response to increasing the electric field strength of the touch sensors previously; or
increasing the preset threshold in response to decreasing the preset threshold previously; or
decreasing the electric field strength of the touch sensors and increasing the preset threshold in response to increasing the electric field strength of the touch sensors and decreasing the preset threshold previously;
so that the capacitive touch sensors restore a function of sensing a touch operation;
or
wherein determining the distance between the object and the terminal based on the raw data generated by the touch sensors comprises:
determining an area of the touch sensors from each of which a sensed signal is greater than the preset threshold; and
when the area is greater than a preset area, determining the distance between the object and the terminal based on the raw data generated by the touch sensors; and the method further comprises:
when, during a preset time period, the area is not greater than the preset area,
decreasing the electric field strength of the touch sensors in response to increasing the electric field strength of the touch sensors previously; or
increasing the preset threshold in response to decreasing the preset threshold previously; or
decreasing the electric field strength of the touch sensors and increasing the preset threshold in response to increasing the electric field strength of the touch sensors and decreasing the preset threshold previously;
so that the capacitive touch sensors restore a function of sensing a touch operation;
or
wherein determining the distance between the object and the terminal based on the raw data generated by the touch sensors comprises:
determining a number and an area of the touch sensors from each of which a sensed signal is greater than the preset threshold; and
when the number is greater than a preset number and the area is greater than a preset area, determining the distance between the object and the terminal based on the raw data generated by the touch sensors; and the method further comprises:
when, during a preset time period, the number is not greater than the preset number and the area is not greater than the preset area,
decreasing the electric field strength of the touch sensors in response to increasing the electric field strength of the touch sensors previously; or
increasing the preset threshold in response to decreasing the preset threshold previously; or
decreasing the electric field strength of the touch sensors and increasing the preset threshold in response to increasing the electric field strength of the touch sensors and decreasing the preset threshold previously;
so that the capacitive touch sensors restore a function of sensing a touch operation.

2. The method of claim 1, wherein the terminal further comprises a receiver, and distances between the touch sensors and the receiver are less than a preset distance.

3. The method of claim 1, wherein the touch sensors are located in a preset region of the terminal.

4. The method of claim 1, further comprising:
when the terminal enters a hands-free call state from the non-hands-free call state,
decreasing the electric field strength of the touch sensors in response to increasing the electric field strength of the touch sensors previously; or
increasing the preset threshold in response to decreasing the preset threshold previously; or
decreasing the electric field strength of the touch sensors and increasing the preset threshold in response to increasing the electric field strength of the touch sensors and decreasing the preset threshold previously.

5. An apparatus for sensing a distance, applicable to a terminal comprising capacitive touch sensors, the apparatus comprising:
a processor, and
a memory for storing instructions executable by the processor,
wherein the processor is configured to:
when the terminal enters a non-hands-free call state, increase an electric field strength of the touch sensors and/or decrease a preset threshold, wherein the touch sensors generate raw data based on sensed signals when the sensed signals are greater than the preset threshold; and
determine a distance between an object and the terminal based on the raw data generated by the touch sensors,
wherein, when determining the distance between the object and the terminal based on the raw data generated by the touch sensors, the processor is further configured to:
determine a number of the touch sensors from each of which a sensed signal is greater than the preset threshold; and
when the number is greater than a preset number, determine the distance between the object and the terminal based on the raw data generated by the touch sensors; and the processor is further configured to:
when, during a preset time period, the number is not greater than the preset number,
decrease the electric field strength of the touch sensors in response to increasing the electric field strength of the touch sensors previously; or
increase the preset threshold in response to decreasing the preset threshold previously; or
decrease the electric field strength of the touch sensors and increase the preset threshold in response to increasing the electric field strength of the touch sensors and decreasing the preset threshold previously;
so that the capacitive touch sensors restore a function of sensing a touch operation;

or wherein, when determining the distance between the object and the terminal based on the raw data generated by the touch sensors, the processor is further configured to:

determine an area of the touch sensors from each of which a sensed signal is greater than the preset threshold; and when the area is greater than a preset area, determine the distance between the object and the terminal based on the raw data generated by the touch sensors; and the processor is further configured to:

when, during a preset time period, the area is not greater than the preset area, decrease the electric field strength of the touch sensors in response to increasing the electric field strength of the touch sensors previously; or increase the preset threshold in response to decreasing the preset threshold previously; or decrease the electric field strength of the touch sensors and increase the preset threshold in response to increasing the electric field strength of the touch sensors and decreasing the preset threshold previously;

so that the capacitive touch sensors restore a function of sensing a touch operation;

or wherein, when determining the distance between the object and the terminal based on the raw data generated by the touch sensors, the processor is further configured to:

determine a number and an area of the touch sensors from each of which a sensed signal is greater than the preset threshold; and when the number is greater than a preset number and the area is greater than a preset area, determine the distance between the object and the terminal based on the raw data generated by the touch sensors; and the processor is further configured to:

when, during a preset time period, the number is not greater than the preset number and the area is not greater than the preset area, decrease the electric field strength of the touch sensors in response to increasing the electric field strength of the touch sensors previously; or increase the preset threshold in response to decreasing the preset threshold previously; or decrease the electric field strength of the touch sensors and increase the preset threshold in response to increasing the electric field strength of the touch sensors and decreasing the preset threshold previously;

so that the capacitive touch sensors restore a function of sensing a touch operation.

6. The apparatus of claim 5, wherein the terminal further comprises a receiver, and distances between the touch sensors and the receiver are less than a preset distance.

7. The apparatus of claim 5, wherein the touch sensors are located in a preset region of the terminal.

8. The apparatus of claim 5, wherein the processor is further configured to, when the terminal enters a hands-free call state from the non-hands-free call state, decrease the electric field strength of the touch sensors in response to increasing the electric field strength of the touch sensors previously; or increase the preset threshold in response to decreasing the preset threshold previously; or decrease the electric field strength of the touch sensors and increase the preset threshold in response to increasing the electric field strength of the touch sensors and decreasing the preset threshold previously.

9. A non-transitory computer-readable storage medium storing instructions that, when executed by one or more processors of a terminal comprising capacitive touch sensors, cause the terminal to:

when the terminal enters a non-hands-free call state, increase an electric field strength of the touch sensors and/or decrease a preset threshold, wherein the touch sensors generate raw data based on sensed signals when the sensed signals are greater than the preset threshold; and determine a distance between an object and the terminal based on the raw data generated by the touch sensors;

wherein, when determining the distance between the object and the terminal based on the raw data generated by the touch sensors, the processor is further configured to:

determine a number of the touch sensors from each of which a sensed signal is greater than the preset threshold; and when the number is greater than a preset number, determine the distance between the object and the terminal based on the raw data generated by the touch sensors; and the processor is further configured to:

when, during a preset time period, the number is not greater than the preset number, decrease the electric field strength of the touch sensors in response to increasing the electric field strength of the touch sensors previously; or increase the preset threshold in response to decreasing the preset threshold previously; or decrease the electric field strength of the touch sensors and increase the preset threshold in response to increasing the electric field strength of the touch sensors and decreasing the preset threshold previously;

so that the capacitive touch sensors restore a function of sensing a touch operation;

or wherein, when determining the distance between the object and the terminal based on the raw data generated by the touch sensors, the processor is further configured to:

determine an area of the touch sensors from each of which a sensed signal is greater than the preset threshold; and when the area is greater than a preset area, determine the distance between the object and the terminal based on the raw data generated by the touch sensors; and the processor is further configured to:

when, during a preset time period, the area is not greater than the preset area, decrease the electric field strength of the touch sensors in response to increasing the electric field strength of the touch sensors previously; or increase the preset threshold in response to decreasing the preset threshold previously; or decrease the electric field strength of the touch sensors and increase the preset threshold in response to increasing the electric field strength of the touch sensors and decreasing the preset threshold previously;
so that the capacitive touch sensors restore a function of sensing a touch operation;

or wherein, when determining the distance between the object and the terminal based on the raw data generated by the touch sensors, the processor is further configured to:
determine a number and an area of the touch sensors from each of which a sensed signal is greater than the preset threshold; and
when the number is greater than a preset number and the area is greater than a preset area, determine the distance between the object and the terminal based on the raw data generated by the touch sensors; and the processor is further configured to:
when, during a preset time period, the number is not greater than the preset number and the area is not greater than the preset area,
decrease the electric field strength of the touch sensors in response to increasing the electric field strength of the touch sensors previously; or
increase the preset threshold in response to decreasing the preset threshold previously; or
decrease the electric field strength of the touch sensors and increase the preset threshold in response to increasing the electric field strength of the touch sensors and decreasing the preset threshold previously;
so that the capacitive touch sensors restore a function of sensing a touch operation.

\* \* \* \* \*